United States Patent Office 3,470,107
Patented Sept. 30, 1969

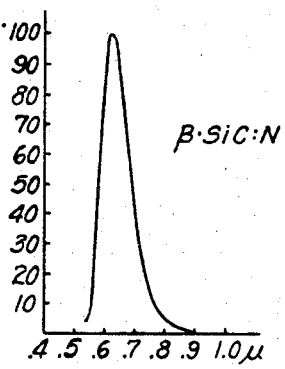
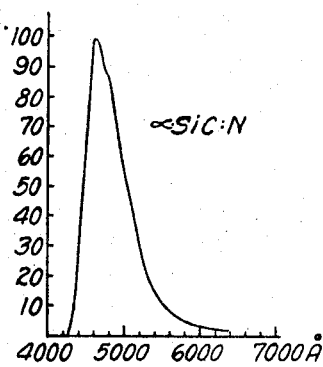
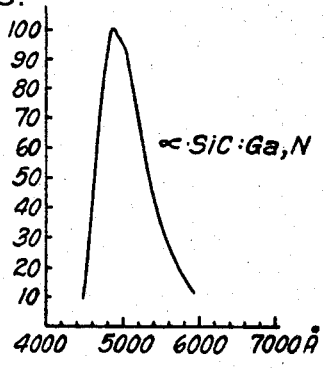
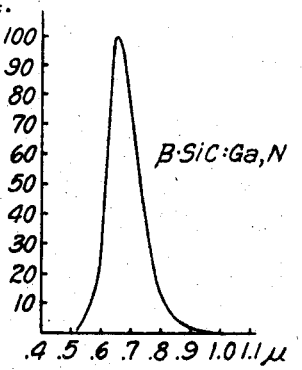
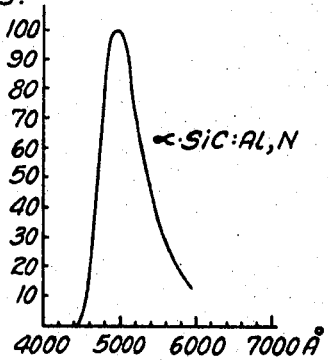
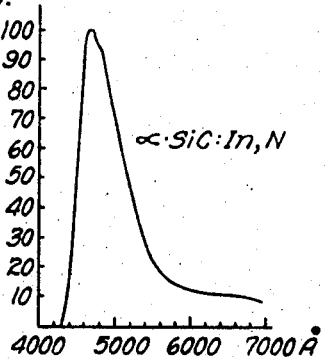

3,470,107
SILICON CARBIDE PHOSPHORS
Arrigo Addamiano, Willoughby, Ohio, assignor to General Electric Company, a corporation of New York
Filed Oct. 15, 1965, Ser. No. 496,325
The portion of the term of the patent subsequent to Jan. 2, 1985, has been disclaimed
Int. Cl. C09k 1/50
U.S. Cl. 252—301.4        4 Claims

ABSTRACT OF THE DISCLOSURE

Silicon carbide is activated by $5 \times 10^{-5}$ to $5 \times 10^{-3}$ atoms of aluminum, gallium or indium per mole of silicon carbide and coactivated by nitrogen or phosphorus sufficiently to compensate for charge deficiency. The material luminesces under 3650 A. longwave ultraviolet excitation at 77° K. and the brightness increases down to liquid helium temperature. The material also luminesces under X-ray excitation at low temperature, under cathode ray excitation at room temperature, and is electroluminescent under suitable conditions.

---

This invention relates to silicon carbide phosphors having low temperature emission.

In my copending application Ser. No. 423,326, filed Jan. 4, 1965 entitled Silicon Carbide Phosphor Powders and assigned to the same assignee as the present invention, now U.S. Patent 3,361,678, I have disclosed silicon carbide phosphors activated by boron and coactivated by a Group V element, preferably nitrogen or, alternatively, phosphorus. I have now determined that cubic and hexagonal silicon carbide phosphors may be prepared by doping or activating with Group IIIa elements other than boron, namely with aluminum, gallium and indium, and counterdoping or coactivating with the same Group V elements, preferably nitrogen or, alternatively, phosphorus. These phosphors are prepared by firing in the appropriate temperature range, from 1500 up to approximately 2100° C. for cubic SiC, and in the range of 2300 to 2500° C. for hexagonal SiC, mixtures of semiconductor grade silicon and spectroscopic grade graphite to which the doping element, that is aluminum, gallium or indium, has been added. Firing is done in an atmosphere of pure argon to which a trace of nitrogen (circa 1 part per thousand) was added, and firing times of 15 minutes up to 2 hours are used, depending upon the size of the charge. After firing, the charge is quenched and the silicon carbide phosphors extracted. Preferably the furnace is a carbon tube furnace and the charge is fired in a crucible of spectroscopically pure graphite. At the end of the operation, the crucible is burned in air at 900° C., and the silicon carbide is then treated with a mixture of hydrofluoric and nitric acid to eliminate possible oxide impurities. It is then washed and dried.

I have determined that Al, Ga and In induce low temperature photoluminescence in cubic SiC ($\beta$SiC) and in hexagonal or rhombohedral SiC ($\alpha$SiC) when the group IIIa element is present in concentrations typical of good ZnS type phosphors, e.g. from $5 \times 10^{-5}$ to $5 \times 10^{-3}$. A preferred range of activator concentration for higher brightness is from $10^{-4}$ to $7 \times 10^{-4}$ atoms per atom of silicon, suitably $5 \times 10^{-4}$ by way of example. The metal doping must be compensated or slightly more than compensated with a group V (donor) element, nitrogen or phosphorus. As previously mentioned, the counterdoping donor element may be introduced in the atmosphere of the furnace. Other methods include the use of silicon nitride; aluminum nitride or gallium nitride may also be used to introduce simultaneously both activator and coactivator. Similarly ammonia, $NH_3$, can be used in lieu of nitrogen; phosphorus or phosphorus-nitrogen compounds may also be used. When the preparation is properly carried out, the end product has a light green color in the case of $\alpha$SiC, and a yellow green tinge in the case of $\beta$SiC. The difference in color is due to the fact that $\alpha$SiC has a larger band gap than $\beta$SiC, 3.0 ev. and 2.39 ev. respectively at 77° K.

Silicon carbide doped with nitrogen only and without Group IIIa doping is luminescent at 77° K. under 3650 A. excitation, with peaks at approximately 0.63 microns for $\beta$SiC:N, and at approximately 0.464 microns for $\alpha$SiC:N. The brightness of these phosphors, however, is somewhat lower than that for instance of $\alpha$SiC:Ga, N or $\beta$SiC:Ga, N both of which are very bright at 77° K. The brightness of luminescence increases as the temperature is reduced further down to liquid helium temperature.

The drawing in FIGS. 1 to 6 shows the emission curves of different $\alpha$ and $\beta$SiC phosphors doped with Group IIIa elements and nitrogen. It is seen that emission occurs throughout the entire visible spectrum, from blue to red. The phosphors are excited to luminescence by cathode rays even at room temperature, and they respond to X-ray excitation if cold. The phosphors also exhibit electroluminescence when properly contacted and operated.

The following examples further illustrate the preparation of silicon carbide phosphors in accordance with this invention.

EXAMPLE 1

A mixture of 3.0 g. of spectroscopically pure graphite and 7.0 g. Si is fired in a crucible of spectroscopically pure graphite for ½ hour to 1 hour at 2000° in an atmosphere of $Ar + 0.1\%$ $N_2$ (or less). The power is then shut off, the crucible eliminated by 900° C. firing in air, the $\beta$SiC obtained treated with a mixture of 4 parts HF and 1 part $HNO_3$, commonly referred to as "white etch," to eliminate $SiO_2$ if any, then washed, dried and ground. The $\beta$SiC:N powder so obtained has the luminescence spectrum indicated in FIGURE 1 when excited at 77° K. with 3650 A., the peak being at 1.96 ev.

EXAMPLE 2

The preparation outlined in Example 1 is repeated firing at 2500° C. for ½ hour. At the end of the operation $\alpha$SiC:N with 77° K. emission is obtained, the emission of this phosphor being shown in FIG. 2 with peak at 2.66 ev.

EXAMPLE 3

A mixture of Si+C, as above, plus a trace of Ga equivalent to $5 \times 10^{-4}$ Ga/SiC is fired for 40 minutes at approximately 2350° C. in $Ar + 0.1\%$ $N_2$. The product of the reaction is then isolated and purified. A bright low temperature phosphor $\alpha$SiC:Ga,N is obtained whose emission at 77° K. is shown in FIG. 3 with peak at 2.52 ev.

EXAMPLE 4

A mixture of Si+C+$5 \times 10^{-4}$ Ga is fired as in Example 3, but the temperature of firing is approximately 2100° C. Cubic $\beta$SiC:Ga,N results whose emission at 77° K. is in the orange-red region as shown in FIG. 4, emission peak occurring at 1.89 ev.

EXAMPLE 5

A mixture of Si+C+$5 \times 10^{-4}$ Al is fired at 2450° C. for ½ hour in $Ar + 0.1\%$ $N_2$, as indicated in the previous examples. A bright low temperature phosphor is obtained, which at 77° K. peaks at 2.48 ev. or 0.500 microns (5000 A.) as shown in FIG. 5. By comparison with the $\alpha$SiC:Ga,N phosphor of Example 3, it is evident that Al introduces a deeper acceptor (or activator) level than Ga.

EXAMPLE 6

The preparation is repeated with In doping; it is found that both $\alpha$SiC:In,N and $\beta$SiC:In,N phosphors gave emission curves very close to those obtained with only N doping but the brightness is slightly higher. The emission curve for $\alpha$SiC:In,N is shown in FIG. 6, the emission peak occurring at 2.63 ev.

What I claim as new and desire to secure by Letters Patent of the United States is:

1. A homogeneous luminescent material consisting essentially of silicon carbide activated by $5\times10^{-5}$ to $5\times10^{-3}$ activator atoms from the group consisting of aluminum, gallium and indium per mole of silicon carbide and coactivated by an element from the group consisting of nitrogen and phosphorus in a quantity sufficient to compensate for the charge deficiency resulting from the presence of the activator.

2. A luminescent material as defined in claim 1 fired in the temperature range from 1500 to 2200° C., preferably at 2100° C. to achieve the cubic or $\beta$ form of SiC with emission shifted towards the orange-red region of the spectrum.

3. A luminescent material as defined in claim 1 fired in the temperature range from 2300 to 2500° C., preferably at 2400° C. to achieve the hexagonal or $\alpha$ form of SiC with emission shifted towards the glue-green region of the spectrum.

4. A homogeneous luminescent material consisting essentially of silicon carbide activated by $10^{-4}$ to $7\times10^{-4}$ coactivator atoms from the group consisting of aluminum, gallium and indium per mole of silicon carbide and coactivated by nitrogen in a quantity at least sufficient to compensate for the charge deficiency resulting from the presence of said activator atoms and resulting in a light body color.

References Cited

UNITED STATES PATENTS

| | | | |
|---|---|---|---|
| 2,854,364 | 9/1958 | Lely | 148—174 |
| 3,129,125 | 4/1964 | Hamilton | 148—174 |
| 3,236,780 | 2/1966 | Ozarow | 252—301.4 |
| 3,361,678 | 1/1968 | Addamiano | 252—301.4 |

TOBIAS E. LEVOW, Primary Examiner

R. D. EDMONDS, Assistant Examiner